(12) United States Patent
Patel et al.

(10) Patent No.: US 8,745,204 B2
(45) Date of Patent: Jun. 3, 2014

(54) MINIMIZING LATENCY IN LIVE VIRTUAL SERVER MIGRATION

(75) Inventors: Alpesh Patel, Cary, NC (US); Senthil Sivakumar, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 727 days.

(21) Appl. No.: 12/722,596

(22) Filed: Mar. 12, 2010

(65) Prior Publication Data

US 2011/0225285 A1    Sep. 15, 2011

(51) Int. Cl.
*G06F 15/173* (2006.01)
(52) U.S. Cl.
USPC .......................... 709/224; 709/238; 718/101
(58) Field of Classification Search
USPC .................. 709/224, 238; 718/101
See application file for complete search history.

(56) References Cited

U.S. PATENT DOCUMENTS

| | | | |
|---|---|---|---|
| 5,903,559 A * | 5/1999 | Acharya et al. | 370/355 |
| 7,660,867 B2 * | 2/2010 | Sakuta | 709/215 |
| 2009/0106409 A1 * | 4/2009 | Murata | 709/223 |
| 2009/0198862 A1 * | 8/2009 | Okitsu et al. | 710/316 |
| 2009/0198975 A1 * | 8/2009 | Arimilli et al. | 712/225 |
| 2010/0054129 A1 | 3/2010 | Kuik et al. | |
| 2010/0214949 A1 | 8/2010 | Smith et al. | |
| 2010/0275199 A1 | 10/2010 | Smith et al. | |
| 2010/0332661 A1 * | 12/2010 | Tameshige | 709/226 |
| 2011/0099403 A1 * | 4/2011 | Miyata et al. | 713/323 |

* cited by examiner

*Primary Examiner* — Waseem Ashraf
*Assistant Examiner* — Marie Georges Henry
(74) *Attorney, Agent, or Firm* — Edell, Shapiro & Finnan, LLC

(57) ABSTRACT

Techniques are provided to facilitate faster live migration of a virtual server from one physical server to another physical server by pausing IO activity of the virtual server and slowing memory state changes for CPU-bound activity of the virtual server during the live migration.

20 Claims, 10 Drawing Sheets

8,745,204 B2

MINIMIZING LATENCY IN LIVE VIRTUAL SERVER MIGRATION

TECHNICAL FIELD

The present disclosure relates to live migration of a virtual server from one physical server to another physical server.

BACKGROUND

Live virtual server migration between physical servers is a very valuable feature made possible by virtualization. The ability to copy the running state of a virtual server from one physical server to another without dropping existing sessions of the virtual server enables capabilities such as physical server shutdown, localization of virtual servers where the optimal virtual server performance is possible, etc.

For live migration, a virtual server disk image is made accessible to the source and target physical servers. For faster copy of the image and the memory state of the virtual server, a common practice is to deploy a dedicated 1 Gigabit (G) or 10 G link between the physical servers in order to copy the image and/or the memory state from the source physical server to the target physical server.

Once the memory state is migrated, the virtual server does not immediately become active at the new location since while the migration is occurring the state on the server is changing. Therefore, the migration process copies the image at a point in time and then the changes on the source physical server are monitored. These changes are then replicated at the target physical server. The continuous change in state delays the live virtual server migration.

DESCRIPTION OF EXAMPLE EMBODIMENTS

Overview

Techniques are provided herein to manage live migration of a virtual server from a first computing apparatus to a second computing apparatus. At the first computing apparatus in which a virtual server is running and is to be migrated to the second computing apparatus, processes of the virtual server are managed during live migration so as to expedite transition of the virtual server from the first computing apparatus to the second computing apparatus. Input/output activity of the virtual server for input/output intensive processes is paused during the live migration and memory state changes for the virtual server are slowed for processor-intensive processes during the live migration.

Example Embodiments

Figure 1:
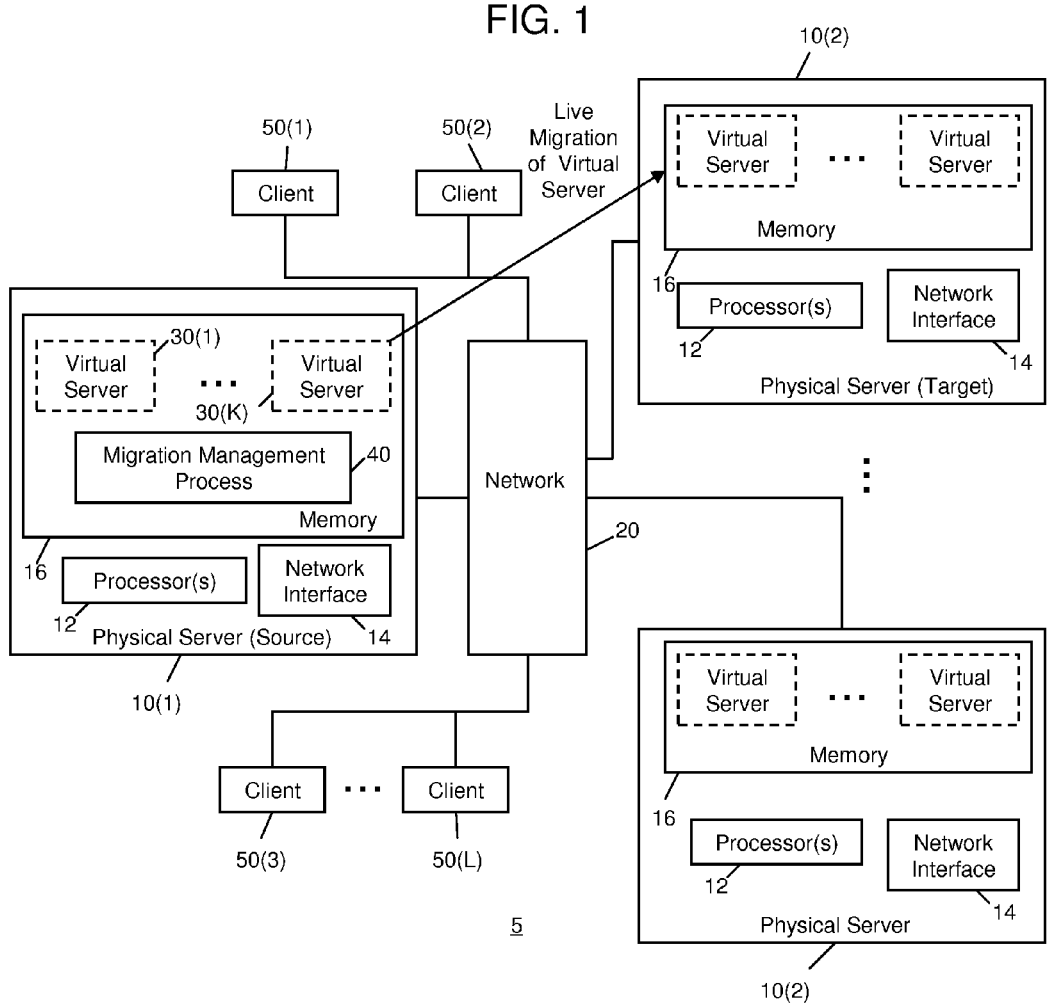
FIG. 1 is an example of a block diagram showing a computing environment in which live migration of a virtual server running on a source physical server to a target physical server is managed so as to minimize latency in the migration.

Reference is first made to FIG. 1. FIG. 1 shows a computing environment 5 comprising a plurality of physical servers 10(1)-10(N). The physical servers 10(1)-10(N) are connected to a network 20, e.g., a local area network or one or more local area networks and wide area networks, i.e., the Internet.

Each physical server is a computing apparatus and comprises one or more data processors 12, a network interface unit 14 and memory 16. There may be other components in each physical server as would appreciated by one with ordinary skill in the art, but for purposes of describing the virtual server migration techniques, these components need not be shown and described.

The processor(s) 12 in each physical server is, for example, one or more microprocessors suitable for a virtual computing environment to support multiple processes. Stored in the memory 16 of physical server 10(1) are instructions and data associated with one or more virtual servers 30(1)-30(K). In addition, instructions are stored or encoded in memory 16 of physical server 10(1) for a migration management process 40. The instructions for the migration management process 40 may be referred to herein as migration management process logic. The migration management process 40 manages the migration of a virtual server, e.g., one of the virtual servers 30(1)-30(K) to another physical server. The processor(s) 12 execute the instructions stored in memory 16 for the migration management process 40 to perform the management of a live migration of a virtual server as described herein.

The processor(s) 12 may be a programmable processor or a fixed-logic processor. In the case of a programmable processor, the memory 16 is any type of tangible processor readable memory (e.g., random access, read-only, etc.) that is encoded with or stores instructions. Alternatively, the processor(s) 12 may a fixed-logic processing device, such as an application specific integrated circuit or digital signal processor, that is configured with firmware comprised of instructions that cause the processor(s) 12 to perform the functions described herein. Thus, instructions for the migration management process 40 may take any of a variety of forms, so as to be encoded in one or more tangible media for execution, such as with fixed logic or programmable logic (e.g., software/computer instructions executed by a processor) and the processor(s) 12 may be a programmable processor, programmable digital logic (e.g., field programmable gate array) or an application specific integrated circuit (ASIC) that comprises fixed digital logic, or a combination thereof. In general, the instructions for the migration management process 40 may be embodied in a processor readable medium that is encoded with instructions for execution by a processor (e.g., processor 12) that, when executed by the processor(s) 12, are operable to cause the processor to perform the functions described herein in connection with process 40.

The operations of the migration management process 40 are described hereinafter in connection with FIGS. 3-10. In the example described herein, the migration management process 40 is executed to migrate virtual server 30(K) from physical server 10(1) to physical server 10(2). In this example, physical server 10(1) is referred to as a "source" physical server and physical server 10(2) is referred to as a "target" or "destination" physical server, with respect to the migration of virtual server 30(K). The virtual server 30(K) could just as well be migrated to any of the other physical servers, but physical server 10(2) is chosen as one example. Moreover, the physical servers 10(1)-10(N) may be within one local area network or in different local area networks that are remote from each other, or a combination thereof, and connected to each other via the Internet.

Each of the other physical servers 10(2)-10(N) may support one or more virtual servers. For example, physical server 10(2) executes virtual servers 32(1)-32(M) and physical server 10(N) executes virtual servers 34(1)-34(P).

A virtual server may serve operations for one or more clients. Those clients may be local or remote to the physical server in which the virtual server is running. To this end, FIG. 1 shows a plurality of clients 50(1)-50(L) connected to network 20. The clients may be software applications running on a personal computer, a hand-held computing device with network connectivity, a wireless mobile communication device or a server computer. Any given virtual server on any of the physical servers 10(1)-10(N) may be serving one or more of the clients 50(1)-50(L).

Figure 2:
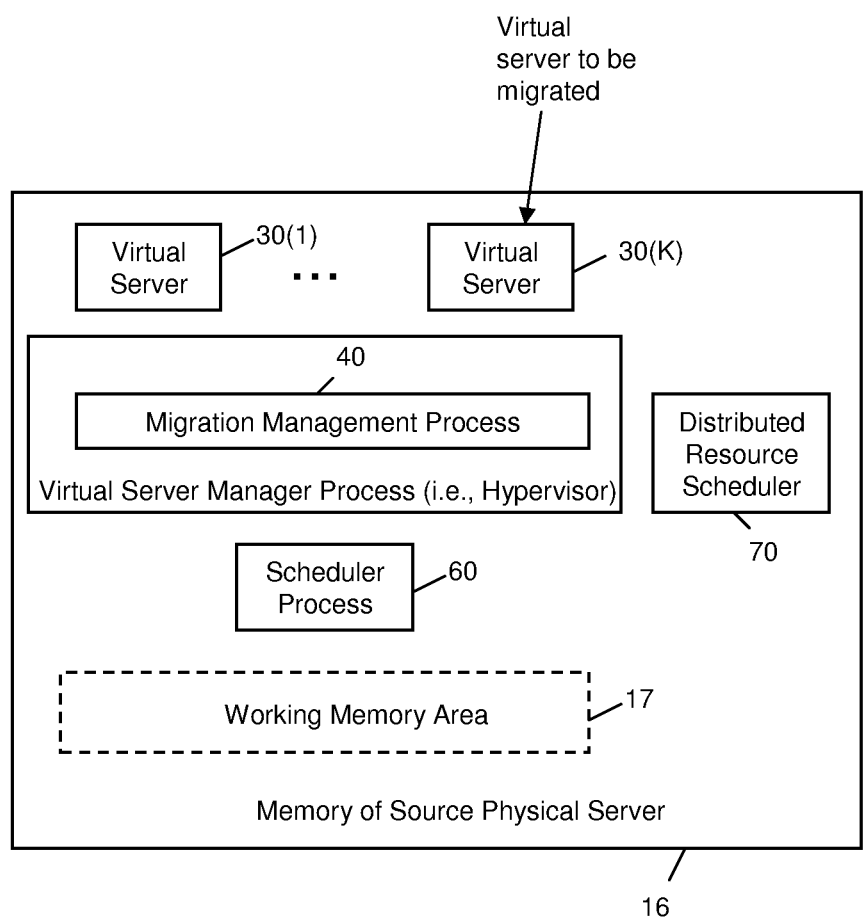
FIG. 2 is an example of a block diagram of software blocks in the source physical server including a migration management process that manages the live migration of the virtual server.

Reference is now made to FIG. 2. FIG. 2 shows a more detailed software block diagram for memory 16 of a physical server, e.g., physical server 10(1). Within a given physical server, the memory 16 comprises a working memory area 17 that is allocated for use by various processes running on the physical server. In addition, the memory 16 stores instructions for the migration management process 40. As depicted in FIG. 2, some or all of the operations of the migration management process 40 described herein may be part a virtual server manager process, also known as a Hypervisor.

A scheduler process 60 controls the allocation of various processes running on the physical server to the working memory area 17. For example, the scheduler process 60 controls the memory allocation, also called a memory time slice that is allocated to each virtual server 30(1)-30(K). The time slice of memory allocation for a virtual server is the amount of time a virtual server is allowed to use the working memory area 17. The distributed resource scheduler (DRS) 70 controls allocation of virtual servers across multiple physical servers and is the software entity that may trigger, in response to an automated command or a manual command of a system administrator, migration of a virtual server to another physical server and also to respond to commands for migrated an incoming virtual server to this physical server.

A virtual server is essentially a collection of data and can be thought of as a data file or, in other words, a disk image. However, the data file is constantly changing according to changes in connections with clients that the virtual server serves and changes in accordance with central processing unit (CPU) intensive operations performed by the virtual server.

For live migration of a virtual server, the virtual server disk image needs to be accessible to both the source physical server and the target physical server. The states of the virtual server, which are changing according to ongoing live activity of the virtual server, are copied from the source physical server to the target physical server.

The continuous changes in the states of the virtual server can delay the live virtual server migration. The existing connections and running states of processes on the virtual server changes the running state of the virtual server. These changes in server state can be classified as those that are the result of input/output (TO) processes, referred to herein as IO-bound, IO-related or IO-intensive processes, or those that are the result of CPU processes, referred to herein as CPU-bound, processor-bound or processor-related or processor-intensive processes.

For IO-bound changes in a virtual server, the updates in the state of the virtual server occur due to existing communications between the virtual server and the clients connected to it, communications with another virtual server and/or communications with other backend servers. In addition, other IO intensive activity are those associated with disk IO or storage IO that do not necessarily require network communications. For example, a virtual server may be writing to or reading from disk or other storage devices that should be slowed down or paused similar to network IO activity in order to expedite live virtual server migration. The pausing of IO activity may also be used for disk IO. In a virtual computing environment, disk IO is not local insofar as the disks are remote and accessed via a network, using, for example, an Internet Small Computer System Interface (iSCSI) over TCP, an Internet Protocol (IP)-based storage networking standard for linking data storage facilities. By carrying SCSI commands over IP networks, iSCSI is used to facilitate data transfers over intranets and to manage storage over long distances. iSCSI can be used to transmit data over local area networks (LANs), wide area networks (WANs), or the Internet and can enable location-independent data storage and retrieval. Other disk IO methods include Fiber Channel or Fiber Channel over Ethernet. In each of these cases, the IO can be delayed or slowed down as described herein.

For processor-bound processes running on the virtual server, the changes in state can occur when the applications on the virtual server are run when the virtual server is scheduled for execution, that is, when the virtual server is allocated memory on the physical server.

This migration management process 40 is configured to speed up the transition of a virtual server from the source physical server to its target or destination physical server. For IO-bound processes of the virtual server, the network activity for virtual server is slowed to thereby minimize the changes due to incoming/outgoing packets or messages. When network activity is slowed down, changes as a result of IO-bound processes are slowed down, thereby reducing changes between the virtual server image file at the source physical server and the virtual server image file at the target physical server. Similarly, for CPU-bound virtual machines of the virtual server, the scheduling of the virtual server (for memory allocation) is slowed down in order to deprive the virtual server of execution time, thereby slowing down and reducing the changes due to CPU-bound processes and consequently speeding up the migration. By managing the IO-bound processes and the CPU-bound processes of a virtual server during live migration in this manner, the image file at the target physical server can more quickly "catch-up" to and match the image file at the source physical server, even as the virtual server is continuing to run. Once the two image files are the same (that is, they have "converged"), then the migration is said to be complete and normal IO-bound and CPU-bound processing can resume.

A given virtual server may comprise predominantly IO-bound processes (e.g., a web server), predominantly CPU-bound processes (e.g., a scientific modeling or simulation application), or a combination of both IO-bound and CPU-bound processes. The migration management process 40 is configured to monitor the behavior of a virtual server to determine whether it involves predominantly CPU-bound processes, predominantly IO-bound processes, or a combination of both IO-bound and CPU-bound processes.

Figure 3:
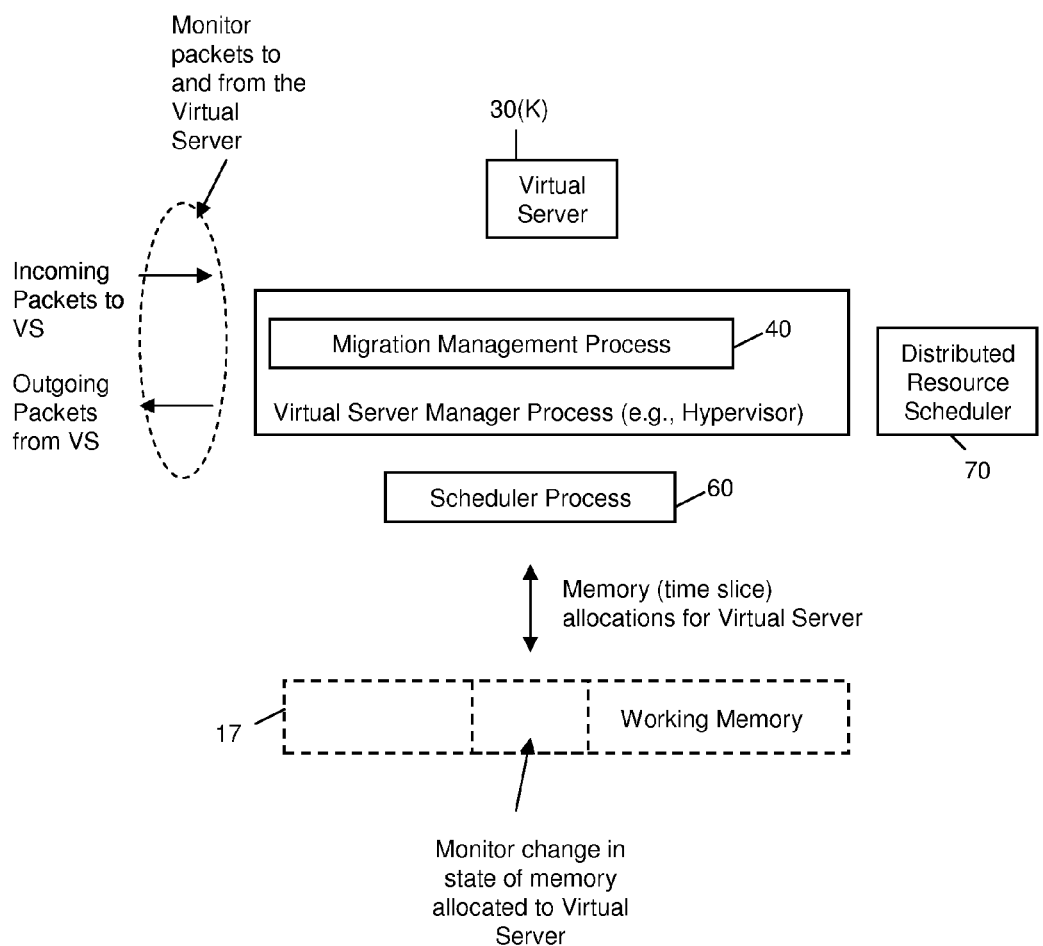
FIG. 3 is an example of a block diagram of software blocks in the source physical server and the behaviors that are monitored to manage the live migration of the virtual server.

The migration management process 40, or the Hypervisor, can monitor the clients and server state once the DRS 70 indicates intent to migrate a virtual server to another physical server. As shown in FIG. 3, the migration management process 40 or the hypervisor can observe the existing flow of packets to and from the virtual server (VS) and detect or "sniff" the incoming and outgoing sequence numbers of the packets. For example, a significant amount of traffic (inbound packets to virtual server and outbound packets from the virtual server) within a given period of time is indicative of IO-bound activity. On this basis, it can be determined whether the virtual server to be migrated, e.g., virtual server 30(K), has IO-bound characteristics. In addition, the migration management process 40 can monitor changes in state of memory allocated to the virtual server in order to determine whether it is changing sufficiently to indicate that the virtual server to be migrated has CPU-bound characteristics. In addition, or as an alternative, the application programming interface (API) between the virtual server and the Hypervisor may be monitored to determine whether the API calls are indicative of CPU-intensive activity of the virtual server.

Figure 4:
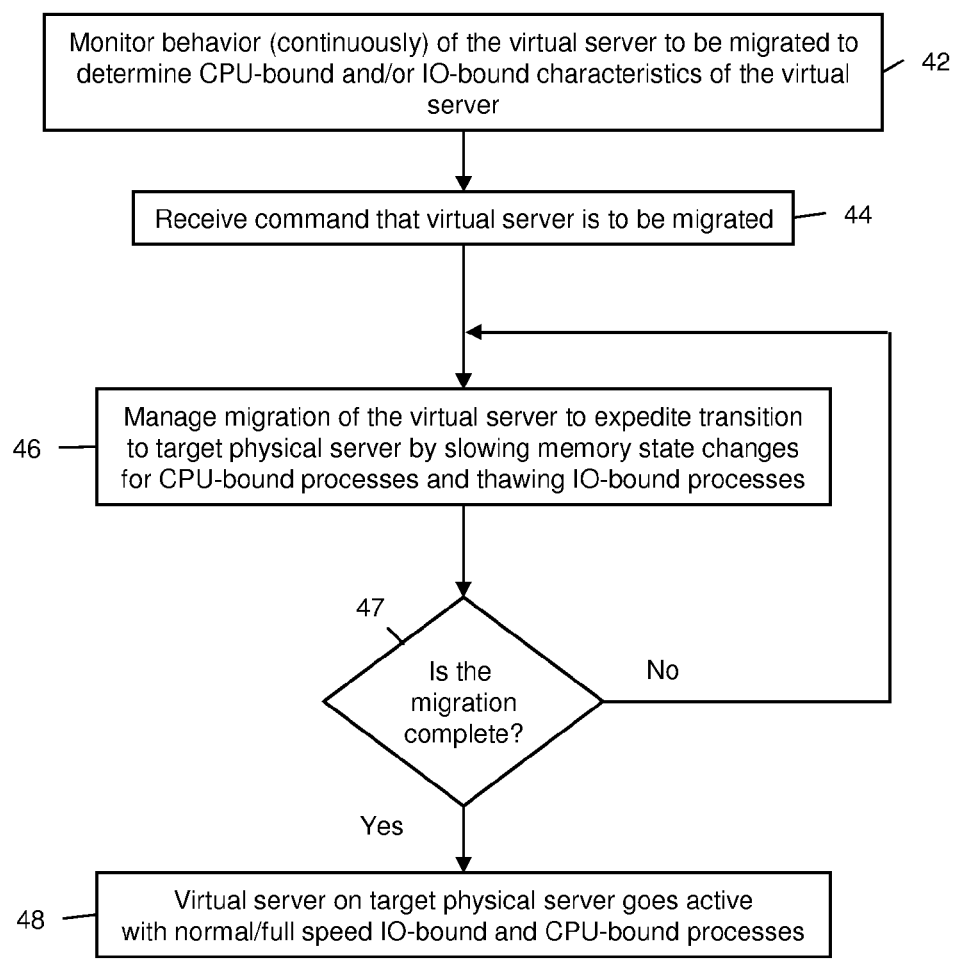
FIG. 4 is an example of a flow chart depicting the high level operations of the migration management process.

Reference is now made to FIG. 4 for a description, at a high level, of the operations of the migration management process 40. At 42, the behaviors of the one or more virtual servers are monitored to determine CPU-bound and IO-bound characteristics of each virtual server. The operation 42 may be performed on a continuous basis for any virtual server in a physical server that may be subjected to migration to another physical server at some point in time. The hypervisor may perform the operation 42 on a continuous basis. At 44, a command is received to perform live migration of a virtual server to another physical server. At this point, the status of the virtual server changes from being "active" on the source physical server to a "migrate" state. This command may originate from the DRS 70 described above in connection with FIG. 2 and received by the migration management process 40 or the hypervisor. At 46, the migration of the virtual server is managed to expedite its transition to the target physical server by slowing the memory state changes for the CPU-bound processes and pausing the IO-bound processes during the migration. The management operations 46 are described in further detail hereinafter in connection with FIGS. 5-10. At 47, a determination is made as to whether the migration is complete. This determination may be made by a comparison between the image file for the virtual server at the source physical server and the image file for the virtual server at the target physical server. When the image file for the virtual server at the source physical server and the image file for the virtual server at the target physical server converges (i.e., there is no difference between them), the migration is said to be complete. When migration is complete, then at 48 the virtual server on the target physical server goes active with normal/full speed IO-bound and CPU-bound processes.

Figure 5:
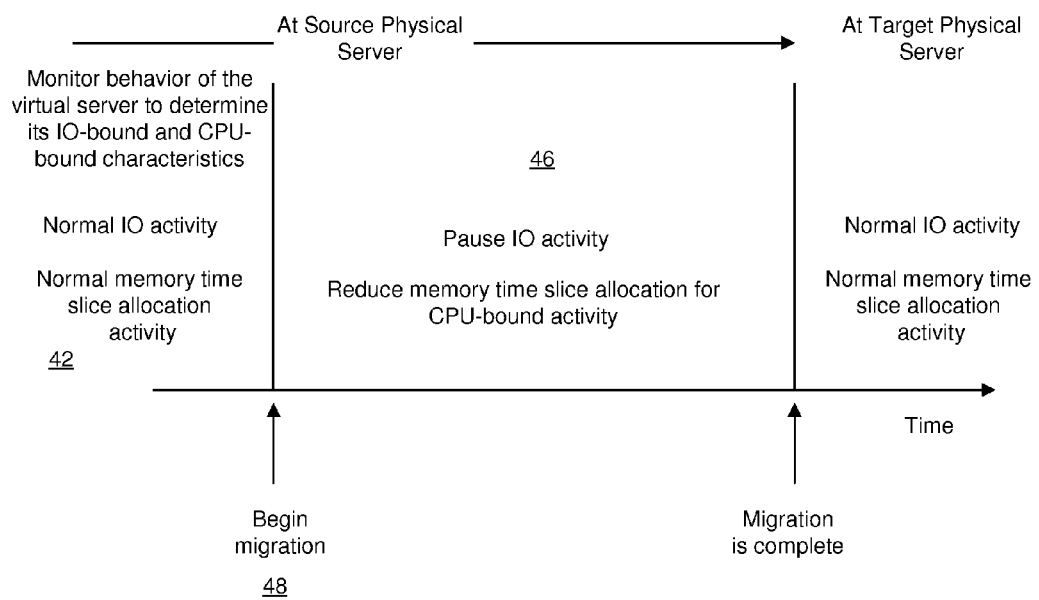
FIG. 5 is an example of a timeline of the virtual server migration and illustrating the operations of the virtual server that are managed to reduce migration latency.

Turning to FIG. 5, a timeline is shown that illustrates operations in connection with migration of a virtual server. Prior to migration, the virtual server operates with normal IO activity for IO-bound processes and normal memory time slice allocation for CPU-bound processes. However, during this time the Hypervisor or the migration management process 40 is monitoring IO-bound and CPU-bound activity of the virtual server (or of each virtual server on the target physical server) to determine the IO-bound and CPU-bound characteristics of the virtual server. This information is used to determine which (or both) of the IO-bound and CPU-bound processes to slow down during the migration of the virtual server when and if a command is received to migrate the virtual server. When the live migration begins, then the migration management process 40 in the source virtual server pauses IO activity and reduces the memory time slice allocation for CPU-bound activity to slow memory state changes during the migration. When migration is complete to the target physical server, then normal IO activity and memory time slice allocation activity resumes for the virtual server at the target physical server.

Figure 6:
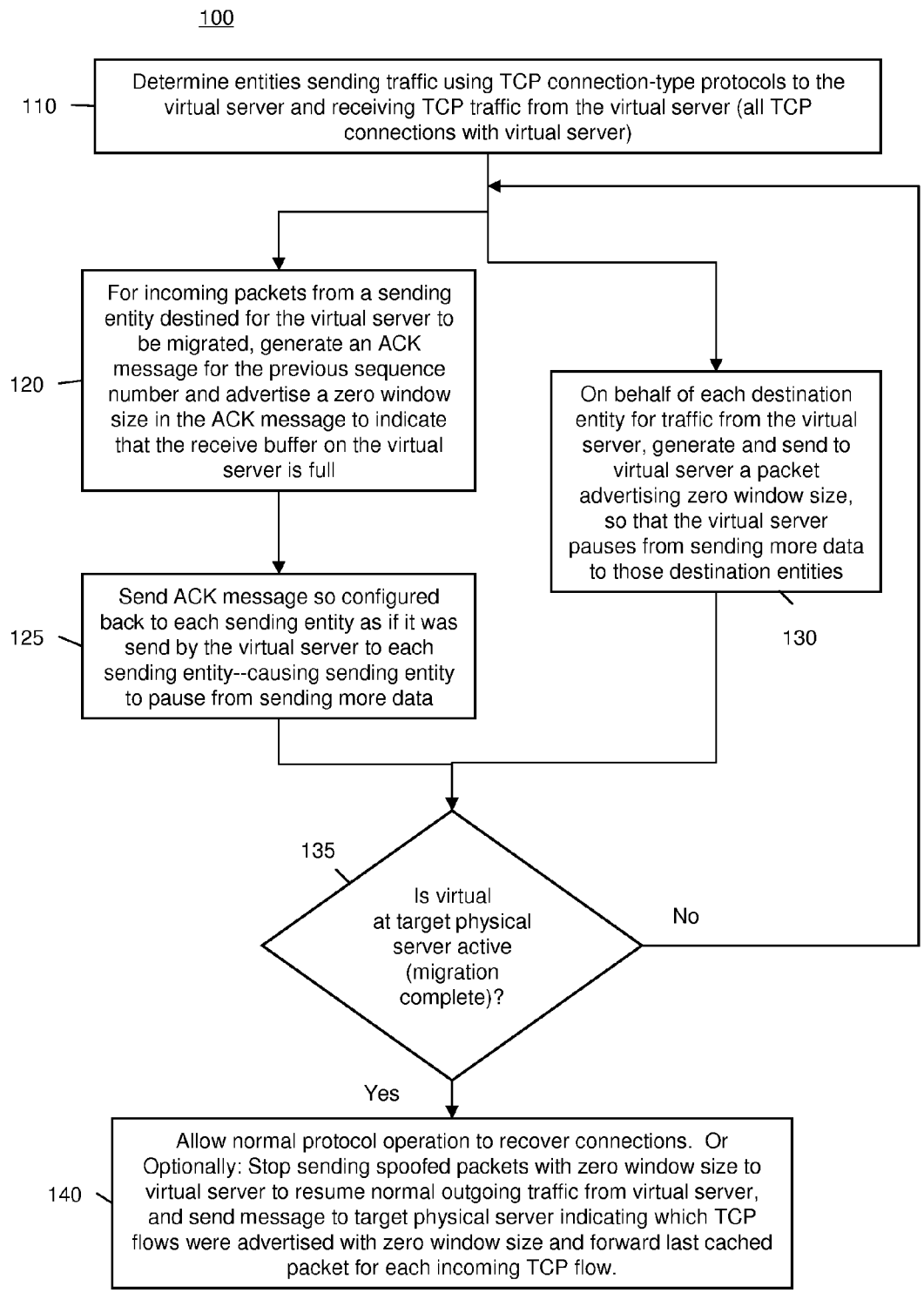
FIG. 6 is an example of a flow chart depicting operations of the migration management process in managing traffic according to Transport Control Protocol (TCP) connection-type protocols during the migration.
Figure 7:
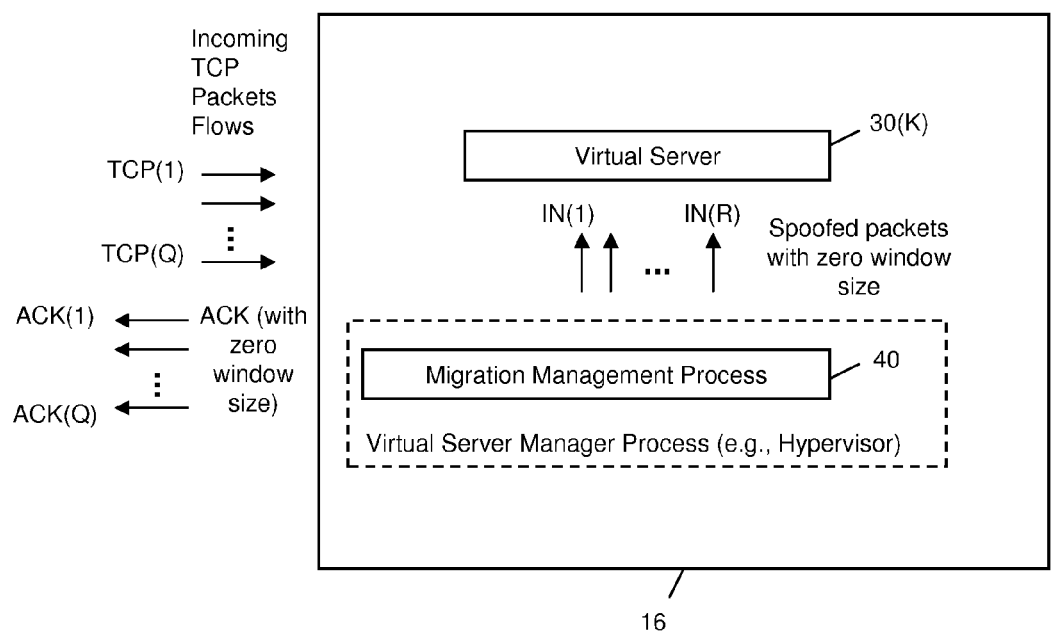
FIG. 7 is a block diagram of software blocks in the source physical server and illustrating operations of the migration management process in managing traffic for TCP connection-type protocols as depicted in the flow chart of FIG. 6.

Reference is now made to FIGS. 6 and 7 for a description of a process 100 that is useful to pause IO-bound activity in the source physical server during a migration. The process 100 is invoked during operation 46 of the migration management process 40 described above in connection with FIG. 4 when the status of the virtual server goes from active to migrate. Furthermore, the process 100 is particularly useful for pausing IO processes that comprise virtual server incoming and outgoing traffic that involves TCP connection-like protocols. At 110, the migration management process 40 determines the entities that are sending traffic using TCP connection-type protocols to the virtual server and those entities receiving TCP type traffic from the virtual server. These entities may be clients, other virtual servers running on the same physical server or another physical server, or other processes running on any computing device with network or other connectivity to the source physical server on which the virtual server to be migrated is currently hosted.

At 120, for incoming packets received from a sending entity to the virtual server, the migration management process generates an acknowledgement (ACK) message for the last received packet or packet with a sequence number prior to the last received packet (in the stream of TCP packets received from that sending entity) and includes information in the ACK message that advertises a zero window size to indicate to the sending entity that the receive buffer on the virtual server is full. The receive buffer on the virtual server need not necessarily be full at this point in time. At 125, the ACK message so configured is sent back to the sending entity in order to, upon reception of this ACK message, cause the sending entity to pause (temporarily stop) from sending packets to the virtual server. Thus, the migration management process "spoofs" an ACK message with an indication that the virtual server cannot receive any further packets in order to apply back pressure to the sending entity to stop sending packets to the virtual server until the virtual server sends an ACK message with a larger window size indicating that the receive buffer on the virtual server has capacity (is no longer full). The migration management process performs operations 120 and 125 for each entity sending TCP-like traffic to the virtual server. This is depicted graphically in FIG. 7 where for a corresponding incoming TCP packet flow TCP(1)-TCP(Q) from different entities 1-Q, an ACK message (with information indicating zero window size on the virtual server) ACK(1)-ACK(Q) is sent.

In addition, at 130, the migration management process, on behalf of each destination entity of traffic from the virtual server, generates and sends to the virtual server a message (packet) comprising information that advertises to the virtual server a zero window size at the receiving entity so that upon receiving this message, the virtual server will pause (temporarily stop) from sending messages to that entity because the virtual server will believe that the receiving entity is not able to receive and buffer TCP-like traffic. The migration management process performs this operation 130 for each entity receiving TCP-like traffic from the virtual server. This is depicted graphically in FIG. 7 where for each of a plurality of destination entities 1-R (which may or may not correspond with a sending entity), the migration management process 40 sends a packet (advertising zero window size on behalf of the destination entity) IN(1)-IN(R) to the virtual server 30(K) being migrated.

The operations 120, 135 and 130 are performed to allow time for the virtual server at the target physical server to "catch up" with the virtual server at the source physical server. This allows the virtual server at the target physical server to take over all connections to and from the virtual server being migrated with gradually increasing window sizes in ACK messages and internally sent messages to the virtual server (on behalf of destination entities of the virtual server).

At 135, a determination is made as to whether the migration is complete (the difference between the virtual server at the target physical server and the virtual server at the source physical server is zero). When migration is complete, then the virtual server at the target physical server can go active. Otherwise, operations 120, 125 and 130 continue to be executed until migration is complete.

At 140, normal protocol operations at the virtual server on the target physical server can recover existing connections for the virtual server. Alternatively, as an option, the migration management process on the source physical server stops sending spoofed packets with zero window size to the virtual server to resume normal outgoing traffic from the virtual server, and also sends a message to the target physical server to indicate which TCP flows were paused (i.e., were advertised with zero window size) and forwards the last cached packet for each incoming TCP flow. This will help the virtual server running at the target physical server to recover the existing TCP connections.

Figure 8:
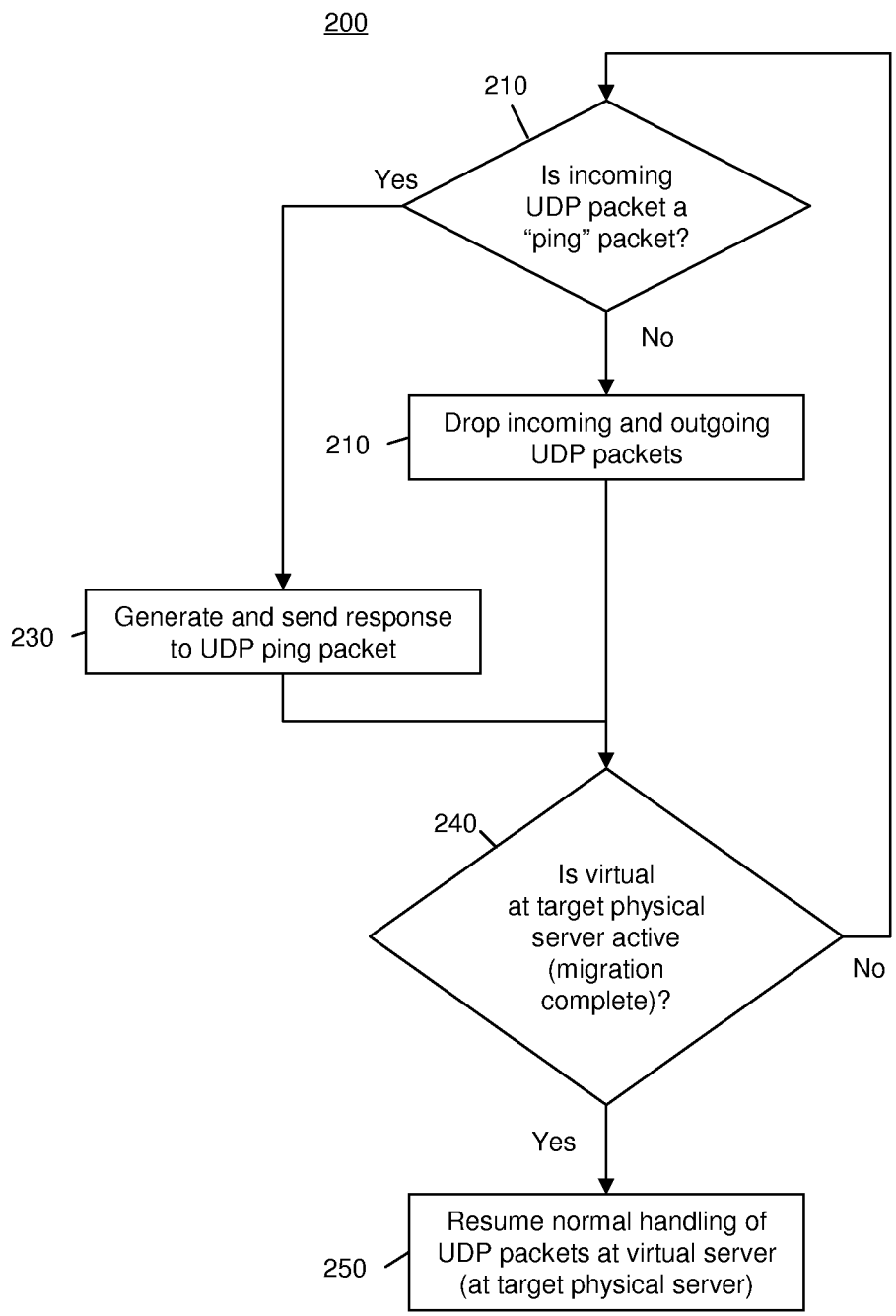
FIG. 8 is an example of a flow chart depicting operations of the migration management process in managing traffic according to Universal Datagram Protocol (UDP) during the migration.

Turning now to FIG. 8, a description of a process 200 is provided. The process 200 is invoked during operation 46 of the migration management process 40 described above in connection with FIG. 4, and is useful for other types of connections, such as Universal Datagram Protocol (UDP) traffic. At 210, a determination is made for an incoming UDP packet as to whether the UDP packet is a "Ping" packet. A UDP Ping is a tool using application-layer UDP packets to provide configurable ping intervals and packet sizes. The UDP Ping uses a server and a client, where a UDP Ping client writes a sequence number and current timestamp into a UDP packet and sends it to the UDP Ping server which echoes the packet data back to the client. The client then reports the round-trip time and calculates the packet loss rate. A UDP packet that is part of a Ping process can be detected by because Ping related packets often use the Internet Control Messaging Protocol (ICMP) for "Echo request" and "Echo reply" messages which, when present, are indicative of a UDP Ping. At 220, when the UDP packet is not a UDP Ping packet, then the incoming or outgoing UDP packet is simply dropped or ignored. At 230, when the received UDP packet is a Ping packet, then the migration management process generates and sends a response to it as the virtual server normally would. At 240, a determination is made as to whether the migration is complete (the difference between the virtual server at the target physical server and the virtual server at the source physical server is zero). When migration is complete, then the virtual server at the target physical server can go active and normal handling of received UDP packets by the virtual server at the target physical server resumes as indicated at 250. Otherwise, operations 210-240 continue to be executed until migration is complete.

Figure 9:
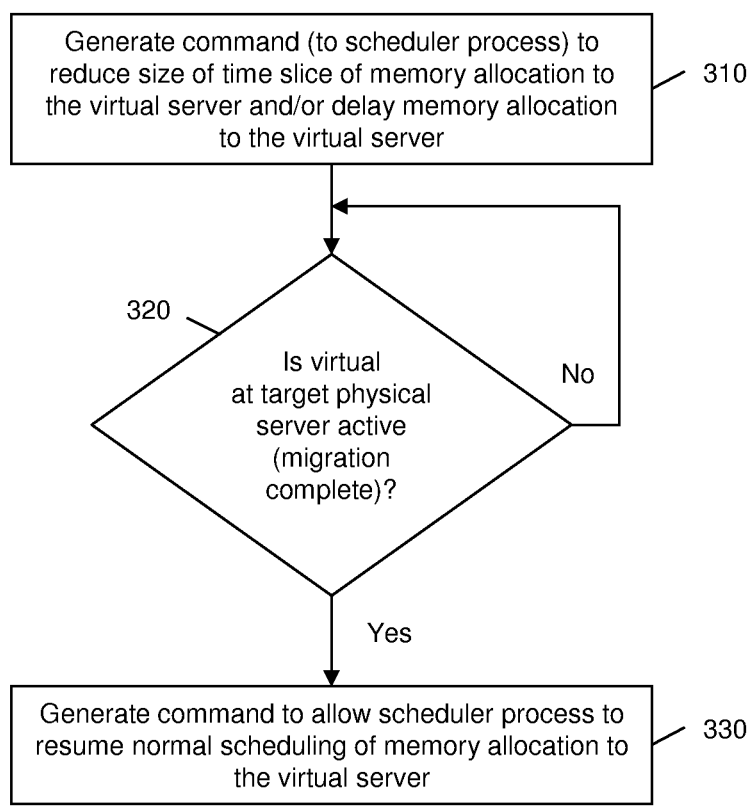
FIG. 9 is an example of a flow chart depicting operations of the migration management process in managing processor-bound operations of the virtual server during the migration.
Figure 10:
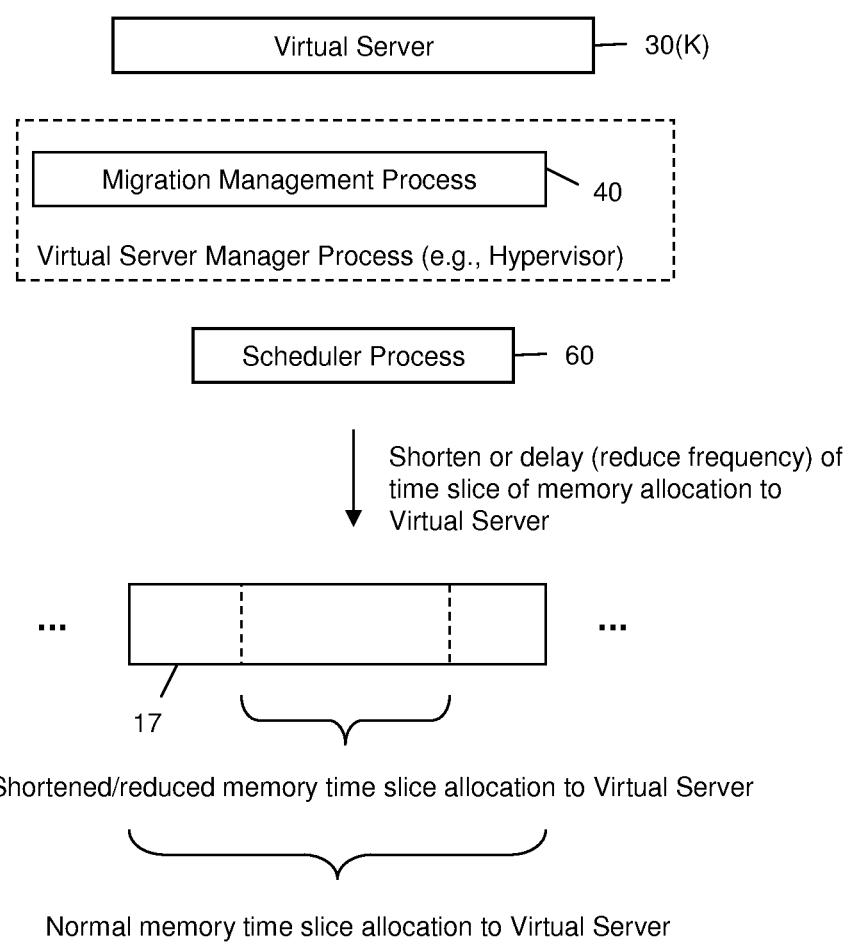
FIG. 10 is an example of a block diagram of software blocks in the source physical server and illustrating operations of the migration management process in managing processor-bound operations as depicted in the flow chart of FIG. 9.

Reference is now made to FIGS. 9 and 10 for a description of a process 300 for managing processor (CPU)-bound operations of the virtual server during migration. Again, the process 300 is invoked when operation 46 shown in FIG. 4 is being executed by the migration management process 40. At 310, a command is generated (to the scheduler process 60 shown in FIG. 3) to reduce the size of the time slice of the memory allocation to the virtual server to be migrated and/or to delay the memory allocation to the virtual server to be migrated. Reducing the memory time slice allocated to the virtual server and/or delaying the memory allocation to the virtual server has the effect of reducing computation time allocated to the virtual server. This in turn slows down the changes in memory state for the virtual server. This is graphically depicted in FIG. 10. Furthermore, the frequency at which memory resources are allocated to the virtual may be reduced to similarly slow down the memory state changes of the virtual server.

At 320, a determination is made as to whether the migration is complete (the difference between the virtual server at the target physical server and the virtual server at the source physical server is zero). When migration is complete, then at 330, a command is generated to allow the scheduler process 60 to resume normal scheduling of memory allocation to the virtual server (in the target physical server).

The techniques described herein facilitate faster live migration of a virtual server from one physical server to another physical server by pausing 10 activity of the virtual server and slowing memory state changes for CPU-bound activity of the virtual server during the live migration. In so doing, live virtual server migration is achieved in a manner that makes the migration transparent to devices and processes that rely on the virtual server.

Accordingly, an apparatus is provided comprising a network interface device configured to send and receive packets over a network; and a processor configured to be coupled to the network interface. The processor executes at least one virtual server and is configured to manage processes of the virtual server during live migration to an other computing apparatus so as to expedite transition of the virtual server to the other computing apparatus.

Likewise, a tangible processor readable medium is provided that is encoded with instructions that, when executed by a processor, cause the processor to, at a computing apparatus configured to support one or more virtual servers, manage processes of the virtual server during live migration to an other computing apparatus in order to slow changes in the virtual server during migration so as to expedite transition of the virtual server to the other computing apparatus.

Furthermore, a method is provided comprising, at a first computing apparatus in which a virtual server is running and is to be migrated to a second computing apparatus, managing processes of the virtual server during live migration so as to expedite transition of the virtual server from the first computing apparatus to the second computing apparatus.

The above description is by way of example only.

What is claimed is:
1. A method comprising:
  at a first computing apparatus in which a virtual server is running and is to be migrated to a second computing apparatus, monitoring on a continuing basis central processing unit processes and input/output processes of the virtual server;
receiving a command to perform a live migration of the virtual server from the first computing apparatus to the second computing apparatus;
changing a status of the virtual server from an active status to a migrate status in response to receiving the command;
determining which one or more of the central processing unit processes and the input/output processes of the virtual server to modify based on the changing of the status;
modifying one or more of the central processing unit processes and the input/output processes of the virtual server during the live migration so as to expedite transition of the virtual server from the first computing apparatus to the second computing apparatus;
comparing an image file for the virtual server at the first computing apparatus and an image file for the virtual server at the second computing apparatus; and
determining that the live migration is complete when the comparing indicates convergence of the image file for the virtual server at the first computing apparatus and the image file for the virtual server at the second computing apparatus.

2. The method of claim 1, wherein modifying comprises slowing memory state changes of the virtual server.

3. The method of claim 2, wherein slowing memory state changes comprises reducing memory time allocation to the virtual server in order to slow memory state changes of the virtual server until migration of the virtual server from the first computing apparatus to the second computing apparatus is complete.

4. The method of claim 1, wherein modifying comprises pausing input/output activity for the virtual server until migration of the virtual server from the first computing apparatus to the second computing apparatus is complete.

5. The method of claim 4, wherein pausing comprises, for traffic using Transport Control Protocol (TCP) connection-type protocols, generating and sending to each sending entity associated with the virtual server an acknowledgment message for incoming packets to the virtual sever including information to indicate to each sending entity that a receiver buffer on the virtual server is full, and on behalf of each destination entity for traffic from the virtual server, generating and sending a message including information indicating to the virtual server that a receive buffer at each destination entity is full so that the virtual server pauses from sending packets to each destination entity.

6. The method of claim 5, and further comprising generating and sending to the second computing apparatus a message indicating which packet flows were paused, and forwarding a last cached packet for each incoming packet flow to the virtual server at the first computing apparatus.

7. The method of claim 4, wherein pausing comprises dropping Universal Datagram Protocol (UDP) packets that are not part of a UDP Ping process, and responding to UDP packets determined to be part of a UDP Ping process.

8. The method of claim 1, wherein monitoring comprises monitoring behavior of the virtual server prior to commencing migration to determine whether virtual server has predominantly input/output related processes and/or predominantly processor related processes.

9. The method of claim 8, wherein modifying comprises slowing memory state changes of the virtual server when it is determined to have predominantly central processing unit related processes and pausing input/output activity for the virtual server when it is determined to have predominantly input/output related processes.

10. The method of claim 8, wherein the modifying is performed by a virtual server manager process in the first computing apparatus.

11. An apparatus comprising:
a network interface device configured to send and receive packets over a network; and
a processor configured to be coupled to the network interface, wherein the processor executes at least one virtual server and is configured to:
monitor central processing unit processes and input/output processes of the virtual server;
receive a command to perform a live migration of the virtual server to another computing apparatus;
change a status of the virtual server from an active status to a migrated status in response to receiving the command;
determining which one or more of the central processing unit processes and the input/output processes of the virtual server to modify based on the changed status; and
modify one or more of the central processing unit processes and the input/output processes of the virtual server during the live migration to an other computing apparatus so as to expedite transition of the virtual server to the other computing apparatus;
compare an image file for the virtual server at the first computing apparatus and an image file for the virtual server at the second computing apparatus; and
determine that the live migration is complete when there is a convergence of the image file for the virtual server at the first computing apparatus and the image file for the virtual server at the second computing apparatus.

12. The apparatus of claim 11, wherein the processor is configured to slow memory state changes of the virtual server for processor-intensive processes of the virtual server during the migration and to pause input/output activity for input/output intensive processes of the virtual server during the migration.

13. The apparatus of claim 12, wherein the processor is configured to monitor behavior of the virtual server prior to commencing migration to determine whether it has predominantly input/output intensive processes and/or predominantly processor intensive processes.

14. The apparatus of claim 12, wherein the processor is configured to slow memory state changes by reducing memory time allocation to the virtual server.

15. The apparatus of claim 12, wherein the processor is configured to pause input/output activity for the virtual server for traffic using Transport Control Protocol (TCP) connection-type protocols, by for each sending entity associated with the virtual server, generating an acknowledgment message for incoming packets to the virtual sever including information to indicate to each sending entity that a receiver buffer on the virtual server is full, and on behalf of each destination entity for traffic from the virtual server, by generating a message including information indicating to the virtual server that a receive buffer at each destination entity is full so that the virtual server pauses from sending packets to each destination entity.

16. A non-transitory processor readable medium encoded with instructions that, when executed by a processor, cause the processor to:

at a computing apparatus configured to support one or more virtual servers, monitor central processing unit processes and input/output processes of the virtual server;

receive a command to perform a live migration of the virtual server from the computing apparatus to another computing apparatus;

change a status of the virtual server from an active status to a migrate status in response to receiving the command;

determine which one or more of the central processing unit processes and the input/output processes of the virtual server to modify based on the changed status; and modify one or more of the central processing unit processes and the input/output processes of the virtual server during the live migration to an other computing apparatus in order to slow changes in the virtual server during migration so as to expedite transition of the virtual server to the other computing apparatus;

compare an image file for the virtual server at the first computing apparatus and an image file for the virtual server at the second computing apparatus; and determine that the live migration is complete when there is a convergence of the image file for the virtual server at the first computing apparatus and the image file for the virtual server at the second computing apparatus.

17. The processor readable medium of claim 16, wherein the instructions that cause the processor to modify comprise instructions that cause the processor to slow memory state changes of the virtual server when it is determined to have predominantly input/output related processes and to pause input/output activity for the virtual server when it is determined to have predominantly input/output related processes.

18. The processor readable medium of claim 17, wherein the instructions that cause the processor to slow memory state changes comprise instructions that cause the processor to reduce memory time allocation to the virtual server.

19. The processor readable medium of claim 17, wherein the instructions that cause the processor to pause input/output activity comprises instructions that when executed by the processor cause the processor to, for traffic using Transport Control Protocol (TCP) connection-type protocols, generate for each sending entity associated with the virtual server an acknowledgment message for incoming packets to the virtual sever including information to indicate to each sending entity that a receiver buffer on the virtual server is full, and on behalf of each destination entity for traffic from the virtual server, generate a message including information indicating to the virtual server that a receive buffer at each destination entity is full so that the virtual server pauses from sending packets to each destination entity.

20. The processor readable medium of claim 17, wherein the instructions that cause the processor to monitor comprise instructions that cause the processor to monitor behavior of the virtual server prior to commencing migration to determine whether the virtual server has predominantly input/output related processes and/or predominantly processor related processes.

* * * * *

UNITED STATES PATENT AND TRADEMARK OFFICE
CERTIFICATE OF CORRECTION

PATENT NO. : 8,745,204 B2  
APPLICATION NO. : 12/722596  
DATED : June 3, 2014  
INVENTOR(S) : Alpesh Patel et al.

Page 1 of 1

It is certified that error appears in the above-identified patent and that said Letters Patent is hereby corrected as shown below:

In the Claims

Claim 11, Line 22, Column 10, please remove the word "and".

Claim 16, Line 12, Column 11, please remove the word "and".

Signed and Sealed this
Twelfth Day of August, 2014

Michelle K. Lee
*Deputy Director of the United States Patent and Trademark Office*